United States Patent [19]

Fima et al.

[11] 4,334,428

[45] Jun. 15, 1982

[54] APPARATUS FOR INDICATING PARAMETERS SENSED ON A ROTATABLE WHEEL

[76] Inventors: Raoul G. Fima, 24901 Cienega La., Mission Viejo, Calif. 92675; Jacques E. Mahieux, 24 Rue des Bleuets, 91440 - Bures, Yvette, France

[21] Appl. No.: 93,633

[22] Filed: Nov. 13, 1979

Related U.S. Application Data

[63] Continuation-in-part of Ser. No. 902,967, May 4, 1978, abandoned.

[51] Int. Cl.³ .............................................. B60C 23/02
[52] U.S. Cl. .................... 73/146.5; 73/129; 340/52 A; 340/58
[58] Field of Search ................ 73/146.2, 146.5, 129; 340/870.31, 58, 52 A, 52 B

[56] References Cited

U.S. PATENT DOCUMENTS

| | | | |
|---|---|---|---|
| 3,092,806 | 6/1963 | Field | 340/58 |
| 3,723,966 | 3/1973 | Mueller et al. | 340/58 |
| 3,911,434 | 10/1975 | Cook | 340/58 X |
| 3,975,706 | 8/1976 | Kato | 340/870.31 X |

*Primary Examiner*—Jerry W. Myracle
*Attorney, Agent, or Firm*—Fulwider, Patton, Rieber, Lee & Utecht

[57] ABSTRACT

A circuit mounted on a rotatable wheel of a vehicle varies its resonant frequency in accordance with tire pressure or another parameter measured on the wheel. The path traveled by the resonant circuit as the wheel turns extends along a coil mounted on the adjacent non-rotatable structure of the vehicle. A magnetic field is produced by the coil when excited by a cyclically varying interrogation signal and the force field interacts with the resonant circuit to the extent that its frequency matches that circuit's resonant frequency. The combined impedance of the coil and the resonant circuit thus vary with the frequency of the interrogation signal to indicate the inflation pressure. The coil may be a ring formed by a circular array of loops each wound about an axis that extends toward the path of the resonant circuit, by one or more elongated loops or a combination of coils that produce a similarly confined and directed field.

If desired, the ring-shaped coil can be mounted on the wheel to interact with a second coil mounted on the non-rotatable structure. For maximum coupling, two ring-shaped coils can be arranged in opposition to each other, one on the wheel and the other on the non-rotatable structure. The inflation pressure can be sensed by a variable inductor connected to a piston or bellows that responds to changes in tire pressure, a fail-safe device being incorporated to prevent the escape of air from the system and to signal the failure of the system.

A provision for sensing brake wear can also be included utilizing a conductor that interacts with the brake pad to activate a circuit at a different resonant frequency.

34 Claims, 20 Drawing Figures

APPARATUS FOR INDICATING PARAMETERS SENSED ON A ROTATABLE WHEEL

CROSS-REFERENCE TO RELATED APPLICATION

This application is a continuation-in-part of application Ser. No. 902,967, filed on May 4, 1978, and entitled "ELECTRONIC TIRE INFLATION PRESSURE SENSOR", now abandoned.

BACKGROUND OF THE INVENTION

The present invention relates to devices for indicating tire inflation pressures and other parameters sensed on a rotatable wheel, and to devices which also sense brake wear.

Tire inflation pressure is a highly significant factor in promoting maximum tire life. An under-inflated tire will wear excessively on the edges whereas over-inflation will cause excessive wear at the center. Moreover, tire pressure affects the roadability of a vehicle since an under-inflated tire has a greatly increased "slip angle" and unequal tire pressures can, therefore, result in unpredictable and dangerous handling characteristics.

To measure the inflation pressure of each tire while a vehicle is stopped is a bothersome procedure often overlooked by otherwise prudent motorists, there being a tendency to rely upon visual inspection to determine whether tires appear "soft". Visual inspection is likely to detect only gross variations in tire pressure, particularly in the case of radial tires. Even extreme variations in pressure are difficult to detect visually when more than two tires are carried by a single axle, as in the case of large trucks and heavy construction equipment.

The need to make the driver of a moving vehicle aware of variations in tire inflation pressure takes on greatly increased importance with the advent of so-called "run flat" tires which are intended to allow the vehicle to run on a deflated tire, thereby eliminating the need for a spare tire. A deflated tire is, however, suitable only for relatively short distances at reduced speeds and the driver must be made aware of the need to affect a repair.

Safety problems associated with incorrect tire inflation pressures are particularly important in the case of aircraft, which are considered "vehicles" as that word is used herein. Demands made on aircraft tires are severe because of the ambient pressure variations that accompany changes in altitude and the high instantaneous loads sometimes produced during landings. The advantages to a pilot of being forewarned of incorrect inflation pressure are readily apparent. Despite the importance of inflation pressure, the pilot has not been provided with an indication of the parameter in state of the art aircraft. Failure to maintain correct pressure has been blamed for a number of recent aviation disasters.

In view of the importance of tire inflation pressure, a variety of pressure sensors have been proposed. Some earlier devices relied upon the direct connection of an air hose to the tire. These devices tend, however, to be heavy and a source of potential air leakage due to the difficulty of connecting a hose mounted on the vehicle chassis to the rotating wheel. Other proposed devices are electrically operated, relying upon sliding contact with sensor components mounted on the wheel. More recently proposed devices utilize electrical interaction between stationary, i.e., non-rotating, components and those mounted on the wheel without the necessity for sliding contact.

Devices of this last mentioned type, exemplified by a sensor described in U.S. Pat. No. 3,723,966, depend upon a force field generated by a stationary coil to produce a response in a resonant circuit mounted on the wheel. Some devices, such as that described in U.S. Pat. No. 3,092,806, employ two concentric coils, one rotatable with the wheel and the other stationary. The ferromagnetic axle and wheel-supporting structure at the center of one of these coils provide a high permeability path in which the magnetic flux tends to be concentrated, producing a field of low intensity in the area in which electro-magnetic interaction between rotating and non-rotating sensor components is intended to take place. Because this field is of low flux density, the clearance between the components must be very small and precise alignment is critical. It is difficult to maintain this alignment over a long period of use in view of the hostile environment and high shock loads received by the unsprung components of the vehicle. In addition, relatively high amplification of a weak signal is required to produce a usable output.

That the above devices have not satisfied the practical demands made upon a tire pressure sensor is apparent since they have not come into common usage. Such a device, to be practical, must be relatively simple, inexpensive and reliable without requiring frequent service. It must be sufficiently sensitive without being significantly effected by dirt, should not be fragile and should not require unduly precise alignment between the closely spaced components mounted on the wheel and the non-rotating vehicle structure. Components mounted on the wheel should be lightweight to avoid an out-of-balance condition and should not require a separate power source. If possible, the sensor should be capable of reading the inflation pressure while the vehicle is standing still, as well as when it is moving, since it will usually be desired to check the tire pressure before the vehicle is put into use, this being particularly true in the case of aircraft. It is also important that the pressure sensor not be a source of air loss.

The problems attendant reading of tire inflation pressure are similar to those that are involved in communicating other parameters that may be read on a rotatable wheel. Examples of such other parameters are axle deflection and tire side wall deflection.

An associated problem in the operation of vehicles is the provision of a signal that indicates the need for brake pad replacement. Brakes of this type used on automobiles, some aircraft and other vehicles utilize high friction brake pads attached by rivets to shoes which are connected to the vehicle frame so they cannot rotate. When the brake is applied, the shoe is moved to engage a smooth metal member in the form of a disk or drum that rotates with a wheel of the vehicle, the friction between the stationary pad and the rotating member providing the braking force. The friction surface of the pad is gradually worn away until the pad has been consumed and must be replaced.

If expensive repairs and brake malfunctions are to be avoided, it is imperative that the pads be replaced before they are worn to the point at which the rivets contact and score the rotatable member. The life expectancy of a pad may be predicted, within broad limits, based on the wear resistance of the material of which it is made, and the working thickness between its original friction surface and the heads of the rivets. Nevertheless, variations in individual patterns of use and driving habits make accurate prediction of replacement intervals impossible. Most vehicles, therefore, require frequent visual inspection of the brake pad, which is a time-consuming and inconvenient process, to guard against brake damage or loss of braking effectiveness due to pad wear. Failure to inspect brake pads with sufficient frequency is not unusual.

It would be highly desirable if a remote indicator responsive to the need to replace brake pads could be provided, eliminating the need for brake pad inspections, and various arrangements have been proposed to this end. Such arrangements have not, however, come into common use, primarily because of the expense and complexity of the components that must be added to the vehicle to perform this function alone.

An objective of the present invention is to provide a sensing system that overcomes the disadvantages of previously known systems, making additional information available to the operator of the vehicle, particularly making available informator relating to tire pressure. A further objective is to provide such an apparatus that is capable of indicating brake pad wear.

SUMMARY OF THE INVENTION

The present invention provides an improved apparatus that satisfies the above requirements. To communicate parameters, such as tire inflation pressure sensed on the wheel, it employs a two-component pick-up, one of the components being a coil formed by one or more loops that direct and concentrate a magnetic force field created by the coil for maximum interaction with the other components. One of the two components rotates with the tire and is directly responsive to the inflation pressure while the other component is mounted on the adjacent stationary vehicle structure.

The invention utilizes a resonant circuit having electrical characteristics that vary with the inflation pressure of a tire and the coil interacts with the resonant circuit electro-magnetically upon receiving an input of a cyclically varying signal. Strong electro-magnetic interaction between the resonant circuit and the coil can be accomplished by utilizing a unique coil configuration that produces a force field concentrated along the path of the resonant circuit. Because of this high intensity, directionally confined field, adequate clearance can be maintained between the coil and the circuit without diminishing the electro-magnetic interaction below the level needed for detection, thus permitting increased tolerance with respect to the alignment. Another advantage of the high intensity field is that it provides a stronger more easily detected electrical response, reducing the need for amplification and permitting the use of a simpler, less expensive arrangement for interrogation of the sensor.

The desired force field can be produced by a coil that includes an array of several series-connected loops, each loop being wound about an axis substantially perpendicular to the array and extending toward the resonant circuit path. The composite force field is directed away from the axle and other surrounding low reluctance metal components to the greatest extent possible. In one coil configuration, the loops are arranged to form stacks that are arranged in an overlapping relationship so that the strength of the field is relatively uniform along the entire path.

An alternative coil configuration utilizes an elongated arcuate loop that extends along the path of the resonant circuit. Several such loops may be used in overlapping relation, preferably with each loop extending more than once around the path. Another arrangement utilizes a pair of oppositely wound coils that produce fields which reinforce each other along a circular area between them but have opposed and cancelling fields at their common center.

In one form of the invention, the positions of the resonant circuit and the arcuate or ring-shaped coil are reversed, with the coil being mounted on the wheel and another circuit that interacts with the coil being mounted in a fixed position on the adjacent non-rotatable vehicle structure. The ring-shaped coil then forms part of the resonant circuit. The choice of the coil position is to be determined by the surrounding structure, considering the space available and the protection offered in the various positions.

An alternative construction utilizes two concentric and parallel ring-shaped or arcuate coils, one mounted on the wheel and the other on the non-rotatable vehicle structure. The wheel-mounted coil then forms part of the resonant circuit that is responsive to tire pressure or other parameters. Both coils should be constructed as described above to confine their magnetic fields to the area in which they oppose one another.

Interrogation of the coil and resonant circuit can be accomplished by a fixed frequency oscillator, the combined impedance of the coil and circuit being a function of the difference between the frequency of the signal and the resonant frequency of the circuit. Alternatively, the coil can be swept by a signal of varying frequency to identify that frequency at which maximum interaction with the circuit occurs.

The resonant circuit is an energy absorbing device. As its resonant frequency deviates from that of the signal supplied by the oscillator, its impedance increases and the amount of energy it absorbs decreases. The condition of the resonant circuit can be read as a function of the amplitude or the phase of the interrogation signal, but it is preferable to detect the phase since it is less sensitive to variations in spacing, temperature and other extraneous influences.

According to another aspect of the invention, other components are added to the system to provide a simple, yet highly reliable and improved brake sensor apparatus which gives a remote indication of the need for the replacement of brake pads. This indication is provided in advance of excessive pad wear or any contact between the rivets that hold the pads and the rotatable member that engages the pads when the brakes are applied. A reserve thickness remains within the working thickness of the pad after the indication is given, so that the pad can safely continue in use temporarily until a convenient opportunity for replacement presents itself.

For purposes of indicating brake pad wear, the invention can utilize an electrical conductor recessed within the friction pad. When the pad is worn away to the extent that the conductor is contacted by the rotatable member, it causes variation in the characteristics of a brake sensor circuit which in turn interacts with the ring-shaped coil. In this way, a second signal, at a different frequency representing brake wear, can be supplied to the interrogation means via the same lines used to indicate the inflation pressure.

Other features and advantages of the present invention will become apparent from the following detailed description, taken in conjunction with the accompanying drawings, which illustrate, by way of example, the principles of the invention.

DESCRIPTION OF THE PREFERRED EMBODIMENT

An exemplary tire pressure sensor constructed in accordance with the present invention and illustrated in FIGS. 1-4 is installed in a vehicle or conveyance (not shown in its entirety). In general, the sensor includes a pressure-responsive circuit 10 mounted on a rotatable wheel 12 of the vehicle, a coil 14 mounted on the non-rotatable vehicle structure 16 that supports the wheel, an interrogation circuit 18 connected to the coil and a remote display device 20 connected to the interrogation circuit.

Figures 1, 2, 2A, 3, 4, 5, 6, 7, 8:
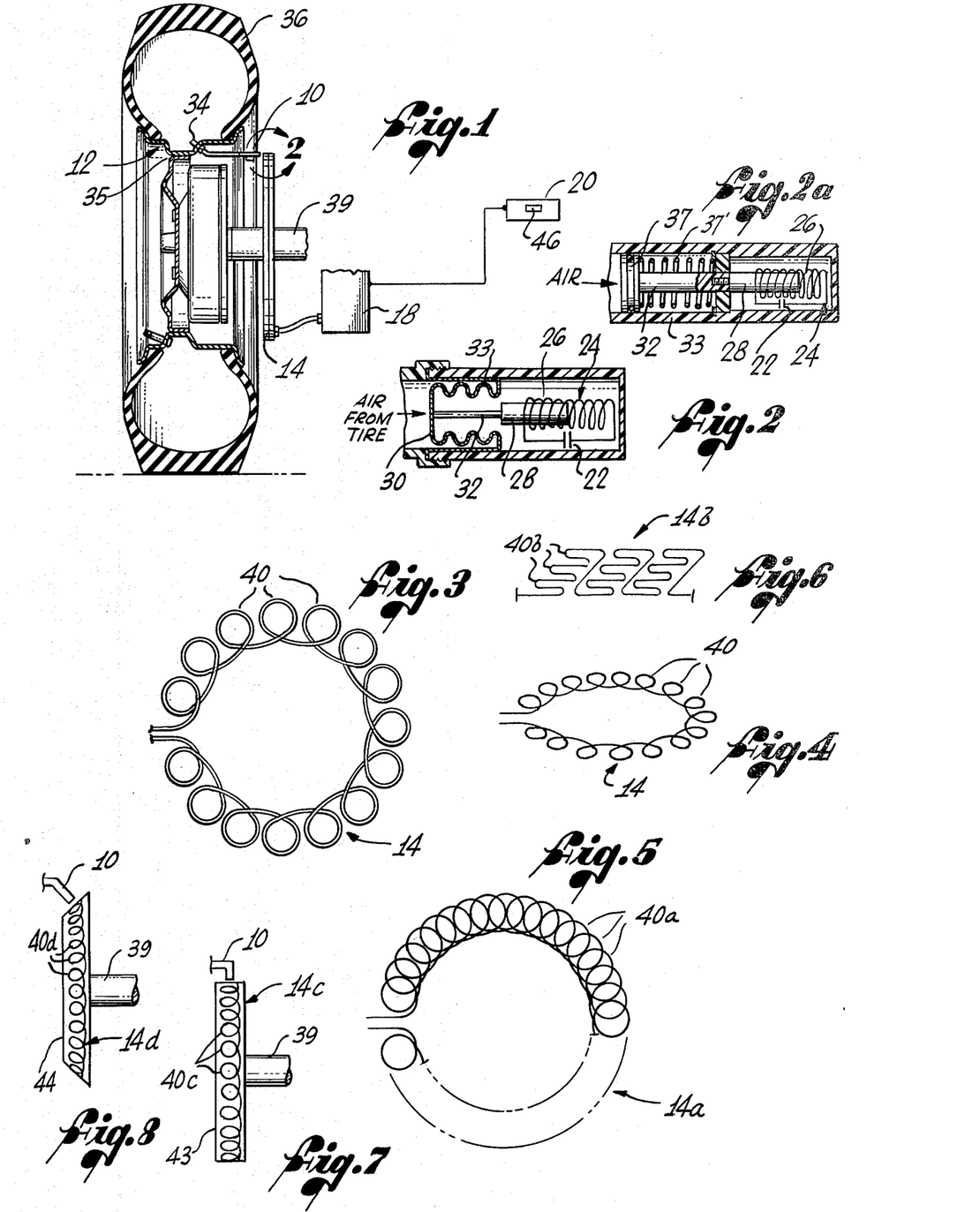
FIG. 1 is a partially cross-sectional view of a wheel equipped with a tire pressure sensor constructed in accordance with the present invention.
FIGS. 2 and 2a are enlarged, cross-sectional, partial schematic views of portions of two alternative wheel-mounted sensor constructions, utilizing a bellows and a piston, respectively, for location as indicated generally by the line 2—2 in FIG. 1.
FIG. 3 is an enlarged side elevation of the coil of the sensor of FIG. 1.
FIG. 4 is a perspective view, on a smaller scale, of the coil of FIG. 3.
FIG. 5 is an enlarged side elevation of an alternative coil configuration.
FIG. 6 is an enlarged, fragmentary end view of another alternative coil configuration.
FIGS. 7 and 8 are schematic end views of portions of two more alternative coil configurations and corresponding pressure sensitive devices.

The pressure-responsive circuit 10, shown in greatest detail in FIG. 2, includes a capacitor 22 having a fixed capacitance and a variable inductor 24 connected in a loop. The inductor 24 is formed by a cylindrical winding 26 having the longitudinal axis about which it is wound parallel to the axis of rotation of the wheel 12 and a ferrite core 28 capable of axial reciprocation within the winding 26. As the core 28 moves, the inductance value of the inductor 24 and the corresponding resonant frequency of the circuit 10 vary accordingly. The circuit 10, of course, has resistance but does not require a resistor as a discrete component. It is preferable to mount the circuit 10 in a position diametrically opposite the valve stem of the wheel 12 so that the circuit and the stem counter-balance each other.

Core movement is produced by compression of a resilient bellows 30 connected to the core 28 by a plunger 32. The bellows 30 is mounted in a small cylindrical housing 33 attached to the wheel 12 and projects radially inwardly from an aperture 34 in the wheel rim 35 so that the exterior of the bellows 30 communicates with the pressurized interior of the tire 36. Attachment of the cylinder 33 to the rim 35 can be accomplished in the same manner as in the installation of a conventional valve stem. The interior portion of the cylinder 33, isolated by the bellows 30 and containing the capacitor 22 and the inductor 24, is completely sealed against contamination by dirt. The end of the bellows 30 and the core 28 to which it is connected assume a position determined by the inflation pressure, the position and spring rate of the bellows being chosen so that the core length inserted in the winding 26 varies over a range of inflation pressures. Preferably the response of the bellows 30 to inflation pressure is linear, but non-linearities can be compensated electronically.

Instead of the bellows 30, an alternative arrangement (shown in FIG. 2a with common reference numbers being used) employs a piston 37 that is slidable reciprocably within the cylinder 33 and biased by a spring 37' against the tire pressure to produce movement of the core 28 as the pressure changes.

The coil 14 is mounted on a non-magnetic ring 38 supported by the axle housing 39 or another portion of the stationary vehicle structure 16 so that it is concentric with the rotational axis of the wheel 12, the diameter of the coil being such that it extends along the path traveled by the resonant circuit 10 as the wheel rotates. The configuration of the coil 14 uniquely produces an annular force field when the coil is excited by a cyclically varying current.

A simple form of the coil 14, shown in FIGS. 1, 3 and 4, consists of a plurality of adjacent loops 40 connected in series and arranged in a circular array so that the coil is essentially flat. Each loop 40 lies substantially within the plane of the array facing the path traveled by the pressure responsive circuit 10. The axis about which each loop is wound is oriented approximately perpendicular to the array, in this case, parallel to the rotational axis of the wheel 12. The force field produced by an individual loop 40 is directed primarily along this loop axis, so that the composite field produced by all the loops is aligned with the path of the resonant circuit 10. It is important that this force field is not concentrated along the high permeability axle housing 39 and other supporting structure 16 at the center of the wheel 12 that would tend to confine the flux to an area away from the resonant circuit 10, as has been the case when prior art sensor coils have been used.

The radial distance from the axis of wheel rotation to the axis on which each loop 40 is wound is equal to the distance between the axis of rotation and the axis on which the inductor coil 26 is wound. As the wheel 12 rotates, these axes pass through a colinear relationship at which maximum electromagnetic interaction takes place, thus maximizing the sensitivity and effectiveness of the sensor.

Another ring-shaped coil configuration 14a, shown in FIG. 5, produces a force field of increased intensity as compared to the coil 14 of FIGS. 3 and 4. Again, the coil loops 40a are series connected and arranged in a circular array. In this second coil 14a, however, the loops 40a overlap each other, thereby permitting more loops and providing more lines of flux in relation to the coil diameter. A slightly greater deviation from the ideal loop orientation may be necessary to accommodate the thickness of the successive over-lapping loops 40a but the loops are still substantially within the plane of the circular array and wound about an axis perpendicular to the array so as to produce the desired annular force field.

A section of a third coil configuration 14b, illustrated in FIG. 6, is formed by a circular array of adjacent stacks 42, each stack being formed by a plurality of overlying loops 40b. The stacks are slanted in overlapping relation so that their respective force fields are blended to form one composite annular filed.

Still another alternative ring-shaped coil configuration 14c, shown in FIG. 7, differs from those described above in that it does not lie within a single plane. Instead, the loops 40c are arranged on the surface of a cylinder 43 that is concentric with the roatational axis of the wheel 12. Nevertheless, each loop 40c, neglecting any slight curvature of the loop itself to conform to the cylindrical surface, is wound about an axis perpendicular to the array , i.e., wound about a radius of the cylinder 43. The resonant circuit 10 is oriented so that the coil 26 is also wound about a radius of the cylinder 40. Thus, as in the case of the coils 14, 14a and 14b described above, the coil 14c is formed by loops 40c that face the path traveled by the resonant circuit 10 as the wheel 12 rotates. The flux produced by the coil 14c is directed radially toward that path.

A coil configuration 14d, shown in FIG. 8, utilizes series connected loops 40d which lie on the surface of a truncated cone 44, the axis of symmetry of the cone being coincident with the rotational axis of the wheel 12. Again, if the small area of the cone 44 occupied by a single loop 40d is considered flat, the loop is observed to be wound about an axis perpendicular to that surface and therefore perpendicular to the array. The resonant circuit 10 is oriented at the proper angle so that each loop 40d faces the path traveled by that circuit and directs its flux toward that path.

The choice of the orientation of the loop, whether planar, cylindrical or conical, should be determined by reference to the location of high permeability flux paths to be avoided with respect to the direction of the field. The coil configurations described above are, however, preferred since they are believed to produce the most concentrated field. Nevertheless, the invention can be practiced using other coil configurations described below.

Figures 9, 10, 11, 12:
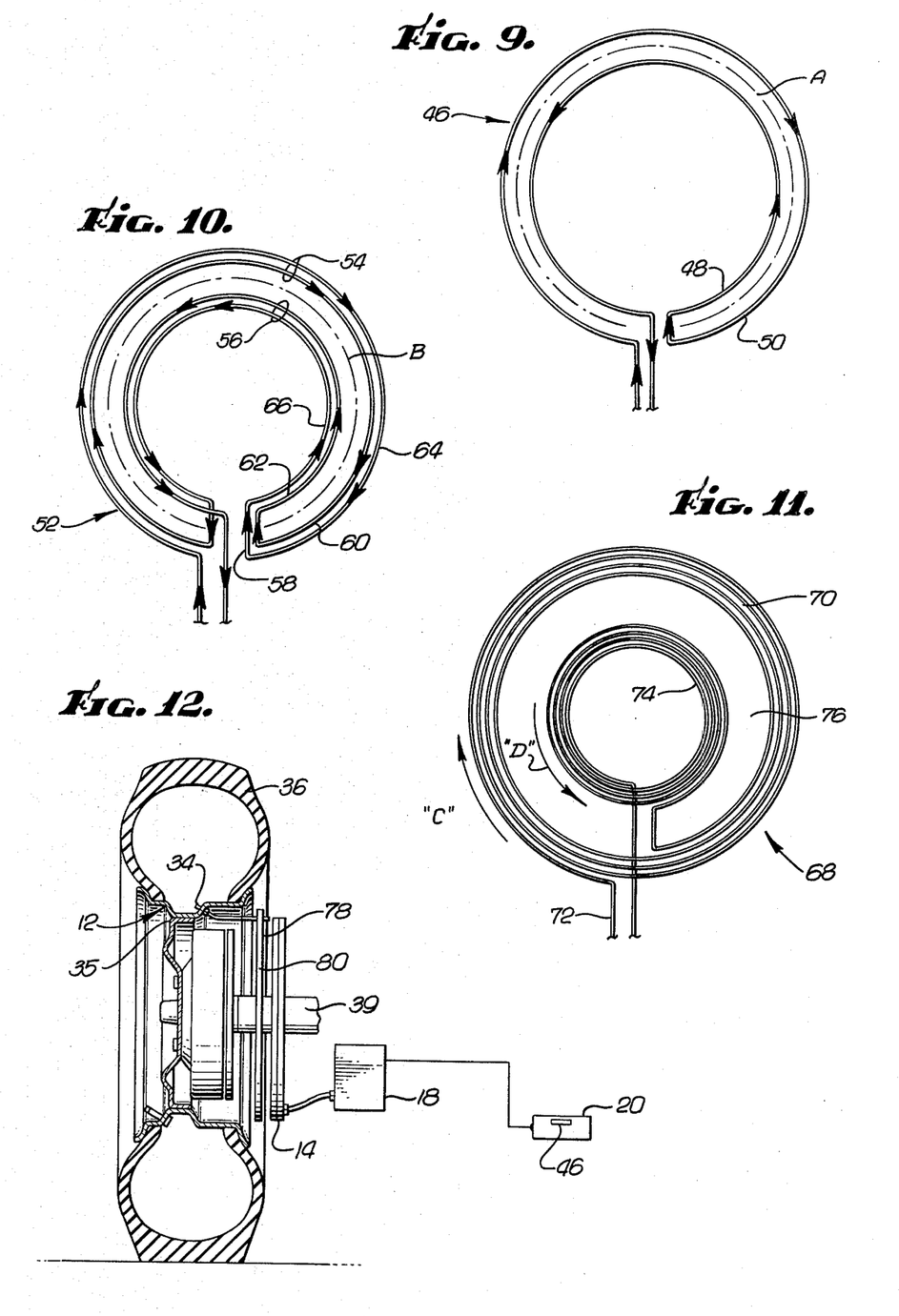
FIGS. 9, 10 and 11 are schematic representations of still other coil configurations.
FIG. 12 is a partially cross-sectional view of a wheel equipped with another embodiment of the invention, utilizing two opposing rings.

A different coil configuration 46, shown in FIG. 9, is formed by a single elongated loop that extends in an accurate manner so that the two ends of the coil, 48 and 50, come together to form a circle. The field generated by this coil 46 extends from an arcuate line or axis "A" along its center and is perpendicular to the plane of the coil. Although the coil 46 is illustrated as lying entirely within a single plane, it can, like the coils 14, 14b and 14c, be formed on the surface of a cylinder or cone instead. In either case, an intensified, highly directional field is generated to interact with the resonant circuit 10.

A principal advantage of the elongated loop configuration of the coil 46 is that the inductance and impedance of the coil are minimized, although the field intensity is not as great as that which can be obtained using a multi-loop coil, such as the coil 14 shown in FIG. 3. If it is necessary to provide a stronger field, it is possible to utilize a coil configuration 52, shown in FIG. 10, in which two elongated, arcuate, concentric loops 54 and 56 are wound so that the fields generated by the loops reinforce each other.

At an end 58 of the first loop 54, the inner wire 60 of the first loop becomes the outer wire 62 of the second loop 56, while the outer wire 64 of the first loop becomes the inner wire 66 of the second loop. This reversal of the wires in the second loop 56 causes the current directions (indicated by arrows in the drawings) to be properly aligned so that the fields of the two loops 54 and 56 reinforce each other in the area between the loops along the imaginary line designated B. In FIG. 10, the second loop 56 is shown as being of smaller diameter than the first loop 54. It will be understood, however, that the two loops 54 and 56 could be of the same diameter stacked one above the other.

It is preferable to have each loop 54 and 56 of the coil 52 extend more than 360 degrees around the ring 14 so that the loops overlap to eliminate weak points in the field that would otherwise occur where the loops end. Additional loops may, of course, be superposed to increase the field strength.

Still another coil arrangement 68 that produces the desired directional magnetic field is shown in FIG. 11. A first coil 70 is formed on the ring 14 by winding a single wire 72 in a clockwise direction for a desired number of turns (four turns being shown for purposes of illustration). Then a second concentric coil 74 of smaller diameter is formed by winding the wire 72 in the opposite direction. Current flow in the first coil 70 (indicated by the arrow "C") is opposite to that in the second coil 74 (indicated by the arrow "D"). At the common center of the coils 70 and 74, the fields oppose and cancel each other. In the annular space 76 between the coils 70 and 74, however, the magnetic fields produced by the two coils reinforce each other. Accordingly, the coil arrangement 70 will produce a concentrated annular magnetic field that can be aligned with the path of the pressure-responsive resonant circuit 10.

Figure 13:
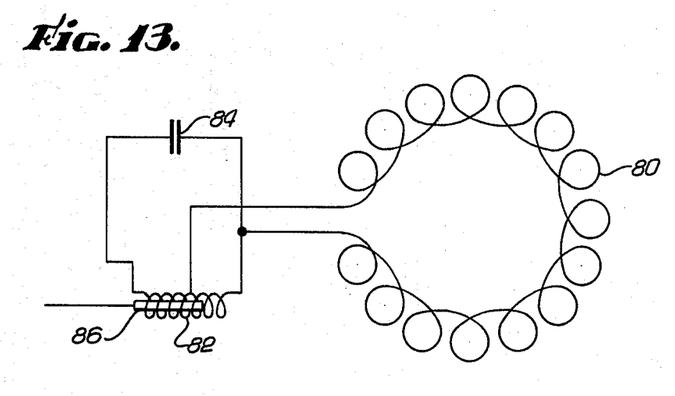
FIG. 13 is a schematic representation of a wheel-mounted tire pressure sensing component that includes a ring-shaped coil.

It should be noted that in each of the embodiments of the invention described above, the ring 14 is mounted on the non-rotatable vehicle structure 39. The system can, however, utilize a ring 78 mounted on the wheel 12 (see FIG. 12 in which those components common to FIG. 1 retain the same reference numbers) which carries a coil 80 that is connected in parallel with a portion of an inductor 82. A capacitor 84 is connected across the inductor 82 to form a resonant circuit (as shown schematically in FIG. 13). The resonant frequency of the wheel-mounted circuit is then controlled by the position of a movable core 86 of the inductor 82, as described above and illustrated in FIGS. 2 and 2a with respect to the inductor 24.

Maximum coupling between the stationary and rotating components is obtained by utilizing the stationary ring 14 as well, the two rings 14 and 78 being of the same diameter and aligned with each other, as shown in FIG. 12. Any of the coil configurations and arrangements described above can be employed on the rings 14 and 78, the only requirement being that the rings must face each other and direct their fields toward each other. The principal advantage of the two ring arrangement is that increased coupling is provided since coupling takes place along the entire surface of both rings and a higher signal-to-noise ratio can be achieved.

It should be noted that it is not necessary, although it is desirable, to use two complete rings 14 and 78. Either of the rings 14 and 78 can be eliminated in favor of an arcuate segment with correspondingly reduced coupling. Pick-up on the non-rotatable side can also be accomplished by a conventionally wound cylindrical induction coil (not shown) placed adjacent the rotatable ring 78 and wound about an axis that extends through that ring. As the wheel 12 rotates, a small segment of the ring 78 is always positioned adjacent to the induction coil.

Positioning of the ring on the non-rotatable structure 39 rather than the wheel 12 is generally preferred when only one ring is used, particularly for automotive use, since a ring mounted on the wheel is more vulnerable and susceptible to damage once the wheel has been removed. The ultimate choice of location for the ring 14 or 78 may, however, be dictated by space limitation and other features of the construction of a particular vehicle.

The interrogation circuit 18, in its simplest form, includes an oscillator that provides an interrogation signal to the coil 14 at the resonant frequency of the coil corresponding to normal tire pressure. At this normal frequency, the resonant circuit 10 on the wheel 12 will interact with the stationary ring-shaped coil 14 to present the lowest possible combined impedance to the interrogation circuit 18, a maximum quantity of energy will be absorbed and a minimum phase shift will occur. When the impedance increases or the phase shift deviates beyond a predetermined level, the interrogation circuit 18 produces an output signal to the display device 20 on the instrument panel of the vehicle (not shown) to illuminate a warning light 46. Alternatively, the interrogation signal may have a frequency corresponding to an above normal inflation pressure and the impedance will indicate the downward deviation of the pressure from that above normal level. The output of the interrogation circuit 10 can then be an analog signal and a meter can be used instead of the warning light 46. In aircraft, in particular, the use of a meter display is desirable.

Another arrangement for reading the tire pressure utilizes an interrogation circuit 18 that produces an interrogation signal having a frequency that varies according to a predetermined pattern. The inflation pressure is then indicated by the point on the frequency pattern at which the resonant circuit 10, which has a narrow band width, interacts with the coil 14 to reduce the combined impedance to a minimum. Whichever arrangement is used, one central interrogation circuit 18 can be used to interrogate a plurality of wheels in time sequence. It will be apparent to those skilled in the art that a variety of well known oscillator arrangements can be employed to produce the above described interrogation signals.

Preferably, the interrogation means 18 includes a phase detector by which the interraction of the ring-shaped coil 14 and the pressure responsive circuit 10 is measured, the phase shift being smallest when the oscillator frequency matches the resonant frequency of the circuit. Although, as indicated above, the amplitude of the signal can be measured instead, phase is a more reliable indication since it is relatively unaffected by variations in spacing between the coil 14 and the pressure sensitive resonant circuit 10 due to misalignment, changes in resistivity due to temperature variation, and other such environmental factors that spuriously effect circuit performance.

Figure 14:
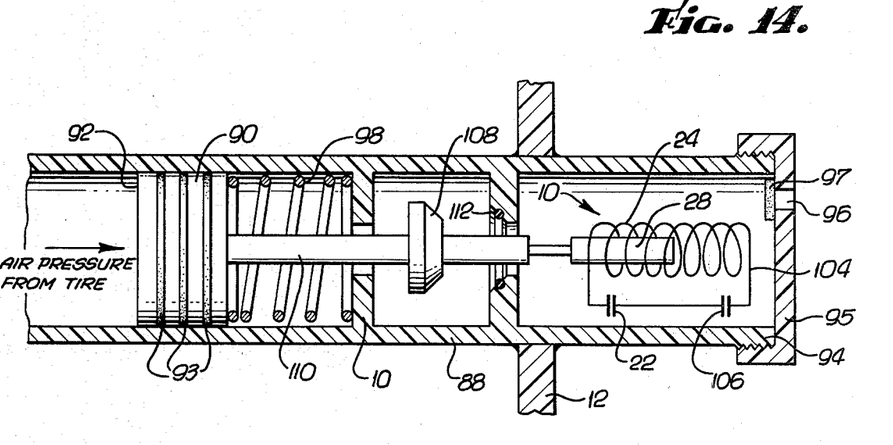
FIG. 14 is a cross-sectional, partially schematic illustration of a wheel-mounted component that incorporates a provision for indicating that the system is out of order.

A more sophisticated version of the pressure-responsive circuit 10 and its surrounding mechanical structure is shown in FIG. 14. As in FIG. 2a, a cylinder 88 is mounted radially in the rim of the wheel 12. A piston 90 is radially reciprocable within the cylinder 88 and exposed to the tire inflation pressure on one surface 92. A plurality of sealing rings 93 between the piston 90 and the cylinder 88 prevent air leakage from the tire 36.

Recognizing that no seal is perfect and that some small amount of air will pass the piston 90 over a period of time, a dust cover 95 at the opposite end 94 of the cylinder is vented by a small aperture 96, covered by a filter 97, to prevent pressure from building up in the cylinder and opposing the internal tire pressure.

As in the mechanism of FIG. 2a, a spring 98 bears against an annular partition 100 within the cylinder 88 and biases the piston 90 toward the interior of the tire 36 and against the tire pressure. On the opposite side of the partition 100 from the spring 98 are the coil 24, in which the core 28 moves, and the capacitor 22 (shown schematically) which are the elements of the pressure sensitive resonant circuit 10.

In the event of a failure of the spring 98, the core 28 would immediately move away from the tire pressure to the farthest extent of its travel since no substantial resistance would be offered to movement of the piston 90 and the core 28 would enter a portion 104 of the coil 100 in which it is not inserted during normal operation of the device. The resonant circuit 10 would then be responsive at a natural frequency outside the range of its variation while the spring 98 is intact. This would provide a unique failure signal indicating that the pressure sensor had failed and that its readings should be disregarded. It is necessary for the interrogation circuit 18 to periodically sweep the frequency of the failure signal.

Another aspect of the wheel-mounted component shown in FIG. 14 is that a valve plug 108 is mounted on a shaft 110 that connects the piston 90 to the core 28. If the spring 98 should fail, travel of the piston 98 is limited by the plug 108 which engages a seat 112 on the annular partition 100 to seal the entire mechanism against the escape of air from the tire 36.

A second version of the wheel-mounted circuit 10 (FIG. 15) utilizes a bellows 30 as in FIG. 2, with the same reference numbers being retained to designte similar components. The bellows 30 is advantageous when compared to the piston arrangement in that it is relatively leakproof and may not require venting. If the interior of the device is not vented, it is not necessary to compensate for variations in ambient pressure. A bellows 30 does not, however, maintain its linearity over a range of travel as large as that of a spring-biased piston. The choice of a piston 90 or bellows 30 may therefore be dictated by the desired travel of the inductor core 28 and the need for linearity.

Figure 15:
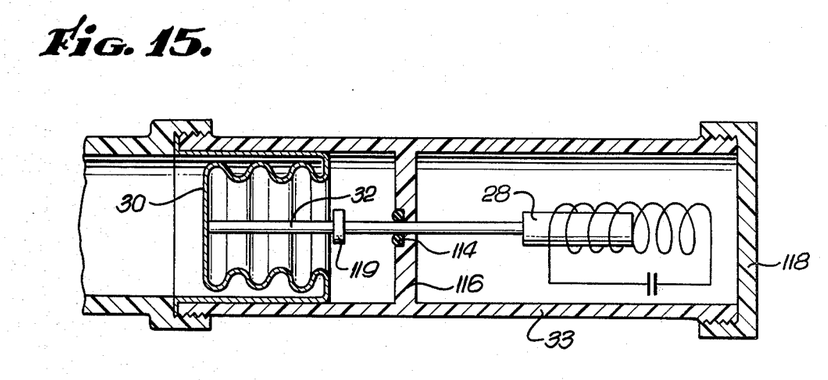
FIG. 15 is a cross-sectional, partially schematic illustration of a bellows-operated, pressure-sensitive wheel-mounted component with a provision for preventing the escape of air in the event of a failure of the component.

An O-ring 114 is seated in a concave annular recess on the inner periphery of a partition 116 and slidably engages the shaft 32 that extends through it. A stop 119 carried by the shaft 32 limits the travel of the core 28.

For assembly purposes, the O-ring 114 is lubricated and the shaft 32 is then inserted before a dust cover 118 closes the end of the cylinder 33 closest to the ring 14. In the event of a leak in the bellows 30, the increased pressure in the end of the cylinder 33 closest to the tire 36 causes the O-ring 114 to seal tightly against the shaft 32 and the partition 116, thereby preventing the escape of air. Movement of the core 28 outside its operational range will produce a relatively large variation in resonant frequency to indicate a failure of the device.

The above described tire pressure monitoring systems of FIGS. 1–15 can incorporate an arrangement for monitoring brake pad wear as well. In an exemplary system, shown in FIGS. 16–19, a conventional disk brake apparatus 120 includes a disk-like, metal rotor 122 attached to a wheel 124 of the vehicle for rotation therewith, and a pair of brake shoes 126 connected to the vehicle frame (not shown) and arranged one on either side of the rotor. When the brake is applied, a brake actuating mechanism 128 causes the brake shoes 126 to move axially toward the rotor 122, clamping the rotor between the shoes and providing the desired retarding force. Actual contact with the rotor 122 is made by friction pads 130, each attached to one of the shoes 126 by a plurality of rivets 132.

Figures 16, 17:
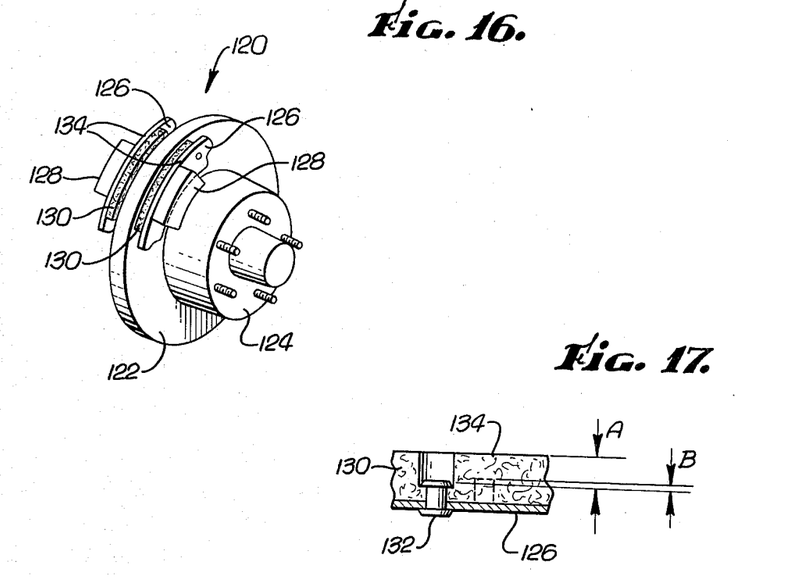
FIG. 16 is a pictorial illustration of a brake apparatus.
FIG. 17 is a fragmentary, cross-sectional view of a brake pad incorporating a wear-sensing wire.

The rivets 132 are recessed within the brake pads 130 to avoid contact with the rotor 122, and the distance between the rivet heads 80 and the flat friction surfaces 134 of the pads define the working thicknesses "A" of the pads, as indicated in FIG. 17. The friction surfaces 134 are, of course, subject to wear, and it is desirable to replace the pads 130 before the entire working thickness has been consumed and the rivets 132 contact the rotor 122, causing the rotor to be scored and necessitating expensive repairs. If the entire thickness of a substantial portion of the pad 130 were worn away, braking effectiveness could be reduced to a dangerously low level, as would be more likely to happen in the case of a pad attached without rivets.

Figure 18:
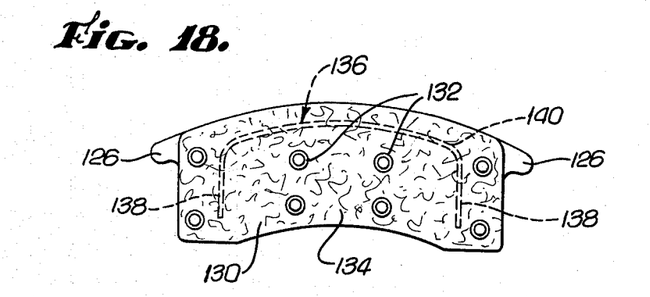
FIG. 18 is a plan view of the brake pad.

The invention includes a unique provision for indicating to the operator of the vehicle the need to replace the brake pad 130 at the appropriate time. As shown in FIG. 18, a conductor in the form of a copper wire 136 is positioned within a channel cut into the back surface of the pad 130 adjacent the shoe 122. So that the rotor 122 will contact the wire 136 before it contacts the rivets 132, the wire must be positioned at a depth within the working thickness "A" of the pad 130. Although the wire 136 is closer to the rivets 132 than it is to the original friction surface of the unused pad 76, it is spaced from the rivet heads 132 to define a reserve thickness "B", indicated in FIG. 17, which can be safely used to operate the vehicle after the wire 136 has been contacted by the rotor 122. This reserve thickness affords a convenient opportunity to replace the pad 130 before damage to the rotor 122 results.

The configuration of the wire 136 is such that it extends substantially across the pad 130 in both the radial and circumferential directions with respect to the rotor 122. This insures that the rotor 122 will contact the wire 136 before contacting any of the rivets 132, even though the pad 130 may be worn unevenly due to a misalignment of the shoe 126.

As shown in broken lines in FIG. 18, the wire 136 is generally U-shaped, having a leg 138 at either end extending in a direction that is substantially radial with respect to the rotor 122, and an interconnecting, curved, middle leg 140 that follows the generally arcuate, circumferential outline of the pad 130 and conforms to the periphery of the rotor. It should be noted that the particular use of the wire 136 described here is merely exemplary and other pad wear sensing arrangements may be employed.

Figure 19:
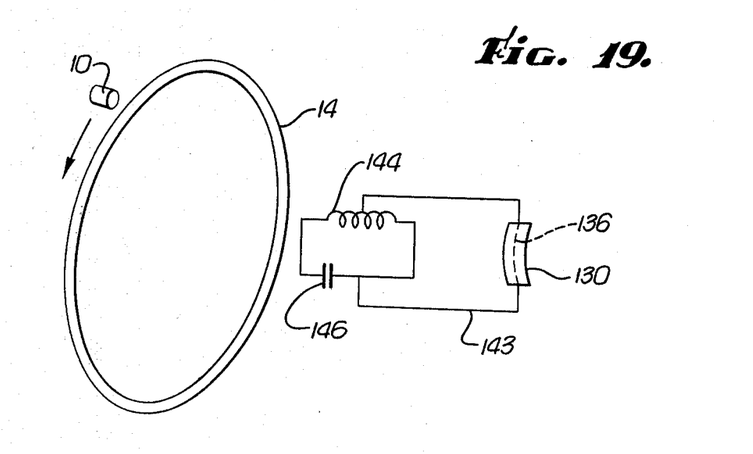
FIG. 19 is a schematic, partially pictorial illustration of a tire pressure sensor constructed in accordance with the invention that incorporates a brake wear sensor.

To provide the desired interaction with the ring 14, the wire 136 is used as part of a brake circuit 143 shown in FIG. 19. An inductor 144 and a capacitor 146 are connected in a loop for parallel resonance at a frequency outside the range of the tire pressure sensitive circuit 10. The wire 136 embedded in the pad 130 shunts a portion of the inductor 144 so that resonance occurs at a predetermined frequency. Once the wire 136 has been severed by the action of the rotor 122, however, the circuit 143 will resonate at a different frequency due to the effective increase in the inductance.

The brake circuit 143 is mounted on the stationary vehicle structure 16 adjacent the ring 14 but on the opposite side of the ring from the pressure-sensitive circuit 10 so that it does not interfere with rotational movement of the pressure-sensitive circuit as the wheel 12 turns. The ring 14 is periodically supplied with each of the frequencies at which the brake circuit may be responsive to determine whether the wire 136 has been severed. Since the circuit always resonates at one of two frequencies, it is always possible to verify that the brake wear detection aspects of the device are operational.

It will be noted that the brake pad wear is only one is a variety of parameters that can be transmitted to a central information processing unit from the wheels 12 of a vehicle by coupling to the ring 14. Thus, a single set of conductors leading to the ring 14 can be used to supply information relating to all such parameters, each parameters being assigned a different frequency and the ring being interrogated at each such frequency in a predetermined sequence.

The invention described above provides a simple and highly effective system for supplying a signal representative of tire pressure or other parameters sensed on a rotatable wheel. It can also serve to communicate other information available at the same location, such as brake pad wear. It is capable of operating in the hostile environment of an aircraft wheel and is relatively immune to disturbance by mud, water, slush and other such contaminants.

While particular forms of the invention have been illustrated and described, it will also be apparent that various modifications can be made without departing from the spirit and scope of the invention.

We claim:

1. For use in a vehicle having a wheel and axle structure, an apparatus for providing on the non-rotatable structure of the vehicle a signal representing a parameter measured on said wheel, said apparatus comprising:

first and second electro-magnetically coupled components, one of said components being mounted on said wheel and the other of said components being mounted on said non-rotatable structure, said first component being a coil formed by at least one loop and arranged to oppose said second component as said wheel rotates, the configuration of said coil being such that it produces a directional magnetic field extending toward said second component to interact therewith, said field extending in a direction other than toward said axle; and interrogation means mounted on said non-rotatable structure for supplying a signal to one of said components and for measuring the combined electrical response of said first and second components.

2. The apparatus of claim 1 wherein said interrogation means is phase sensitive.

3. The apparatus of claim 1 wherein said first component is mounted on said non-rotatable structure.

4. The apparatus of claim 1, wherein said second component is mounted on said non-rotatable structure.

5. The apparatus of claim 1 wherein said second component is also a coil formed by at least one loop, the configuration of said coil of said second component being such that it produces a directional magnetic field extending toward said first component.

6. The apparatus of claim 1 wherein said coil is formed by a circular array of loops.

7. The apparatus of claim 1 comprising means mounted on said non-rotatable structure for monitoring brake pad wear and for interacting electro-magnetically with one of said components to provide a signal indicative of brake wear.

8. The apparatus of claim 1 further comprising means for providing an indication of a failure of said component mounted on said wheel.

9. An apparatus for providing on the non-rotatable structure of a vehicle a signal representing a parameter measured on a rotatable wheel of said vehicle, said apparatus comprising:
first and second electro-magnetically coupled components, one of said components being mounted on said wheel and the other of said components being mounted on said non-rotatable structure, said first component being a coil formed by at least one elongated arcuate loop and arranged to oppose said second component as said wheel rotates, the configuration of said coil being such that it produces a directional magnetic field extending toward said second component to interact therewith; and
interrogation means mounted on said non-rotatable structure for supplying a signal to one of said components and for measuring the combined electrical response of said first and second components.

10. An apparatus for providing on the non-rotatable structure of a vehicle a signal representing a parameter measured on a rotatable wheel of said vehicle, said apparatus comprising:
first and second electro-magnetically coupled components, one of said components being mounted on said wheel and the other of said components being mounted on said non-rotatable structure, said first component being a coil formed by a plurality of concentric elongated arcuate loops and arranged to oppose said second component as said wheel rotates, the configuration of said coil being such that it produces a directional magnetic field extending toward said second component to interact therewith; and
interrogation means mounted on said non-rotatable structure for supplying a signal to one of said components and for measuring the combined electrical response of said first and second components.

11. The apparatus of claim 10 wherein said coil is ring-shaped and each of said loops extends more than one complete turn around said coil.

12. A tire inflation pressure sensor comprising:
a coil mounted on the stationary structure of a vehicle adjacent a wheel mounted on an axle of said vehicle;
pressure sensitive means mounted on said wheel to rotate therewith in an orbital manner for responsing to the inflation pressure of a tire and for electro-magnetically interacting with said coil in accordance with said inflation pressure, said coil being formed by at least one loop oriented so that it faces the path traveled by said pressure-sensitive means as said wheel rotates and produces a directional magnetic field extending toward said path, said field extending in a direction other than toward said axle; and
interrogation means mounted on said non-rotatable structure for supplying a signal to said coil and for measuring the combined electrical response of said pressure sensitive means and said coil.

13. The sensor of claim 12 wherein said pressure-sensitive means comprise a resonant circuit.

14. The sensor of claim 13 wherein said resonant circuit includes a variable inductor.

15. The sensor of claim 12 wherein said pressure-sensitive means includes means for varying the resonant frequency thereof.

16. The sensor of claim 12 wherein said interrogation means supplies a cyclically varying signal to said coil and measures the phase of said signal to determine said tire pressure.

17. The sensor of claim 16 wherein said pressure-sensitive means includes an inductor having a winding wound about an axis so oriented that it passes through a colinear relationship with the axis about which said loop is wound as said wheel rotates.

18. The sensor of claim 12 wherein said pressure-sensitive means includes an inductor having a winding wound about an axis so oriented that it passes through a colinear relationship with the axis about which said loop is wound as said wheel rotates.

19. The sensor of claim 12 wherein there are a plurality of said loops arranged in an overlying relationship to form at least one stack.

20. The sensor of claim 12 wherein said pressure-sensitive means includes means for indicating a failure thereof.

21. The sensor of claim 12 wherein said pressure-sensitive means comprises an induction coil, a capacitor arranged to form a tuned circuit, and core means normally movable within said induction coil and further movable upon failure of said pressure-sensitive means, whereby the resonant frequency of said pressure-sensitive means normally falls within a predetermined range and indicates tire pressure and said resonant frequency lies outside said range upon failure of said pressure-sensitive means.

22. The sensor of claim 21 wherein said pressure-sensitive means further comprises a piston exposed to the inflation pressure of said tire and a spring biasing said piston toward said tire.

23. In a conveyance having at least one rotatable wheel with an inflatable tire thereon and a non-rotatable structure on which said wheel is supported, a tire inflation pressure sensor comprising:
a resonant circuit mounted on said wheel including pressure sensitive means for varying the resonant frequency of said circuit in accordance with the inflation pressure of said tire;
a ring-shaped coil mounted on said non-rotatable structure concentric with the axis of rotation of said wheel for interaction with said resonant circuit, said coil including a series of loops arranged in a circular array, each of said loops being wound about an axis substantially perpendicular to said array and directed toward the path traveled by said resonant circuit as said wheel rotates; and interrogation means connected to said coil for supplying a signal to one of said components and for measuring the combined response of said coil and said resonant circuit to a cyclically varying signal thereby determining the inflation pressure of said tire.

24. The apparatus of claim 23 wherein said pressure sensitive means comprises a reciprocable movable member subject to the inflation pressure of said tire and resilient means for biasing said reciprocable member against said inflation pressure.

25. The apparatus of claim 24 wherein said resonant circuit comprises a variable inductor operatively connected to said reciprocable member and a fixed capacitor.

26. The apparatus of claim 23 wherein said interrogation means comprises oscillator means for generating a cylically varying interrogation signal and detection means for measuring the combined electrical response of said resonant circuit and said coil.

27. The apparatus of claim 26 wherein said detection means is responsive to the phase of said signal.

28. The apparatus of claim 23 wherein said loops of said coil are arranged in an overlapping series.

29. The apparatus of claim 23 wherein said resonant circuit includes an arcuate coil forming at least a portion of a ring concentric with and opposing said ring-shaped coil mounted on said non-rotatable structure, said arcuate coil facing said ring-shaped coil.

30. In a conveyance having at least one rotatable wheel with an inflatable tire thereon and a non-rotatable structure on which said wheel is supported, a tire inflation pressure sensor comprising:

a resonant circuit mounted on said wheel including a capacitor, an inductor and pressure sensitive means responsive to the inflation pressure of said tire for varying the impedance of said inductor in accordance with the inflation pressure and thereby varying the resonant frequency of said circuit;

a ring-shaped non-rotatable coil mounted on said non-rotatable structure concentric with the axis of rotation of said wheel for impedance varying interaction with said resonant circuit, said coil including a plurality of loops arranged in a circular array, each of said loops being wound about an axis substantially perpendicular to said array to produce a magnetic field, said coil extending along the path traveled by said resonant circuit as said wheel rotates so that said resonant circuit is at all times aligned with said field;

interrogation means connected to said coil for measuring the combined electrical response of said coil and said resonant circuit to a cyclically varying signal and thereby determining the inflation pressure of said tire; and display means responsive to said interrogation means for providing information relating to said inflation pressure.

31. An apparatus for providing on the non-rotatable structure of a vehicle a signal representing a parameter measured on a rotatable wheel of said vehicle, said apparatus comprising:

a first coil mounted on said wheel of said vehicle for rotation therewith;

a second coil mounted on said non-rotatable structure of said vehicle adjacent to said first coil;

said first and second coils each being of a configuration such that they produce directional magnetic fields extending towards each other and each forming at least a portion of a ring;

circuit means for varying the combined impedance of said coils and said circuit means in accordance with said parameter; and interrogation means mounted on said non-rotatable structure for measuring the combined electrical response of said coils and said circuit means.

32. The apparatus of claim 31 wherein said circuit means and said first coil form a resonant circuit the resonant frequency of which varies in accordance with said parameter.

33. The apparatus of claim 31 further comprising means for interacting with said second coil in accordance with variations in a second parameter.

34. In a conveyance having at least one rotatable wheel with an inflated tire thereon and a non-rotatable supporting structure on which said wheel is mounted, a tire inflation pressure sensor comprising:

a resonant circuit mounted on said wheel including a capacitor of fixed capacitance, a variable inductor, and pressure-sensitive means responsive to the inflation pressure of said tire for varying the inductance of said inductor in accordance with said inflation pressure and thereby varying the resonant frequency of said circuit, said pressure sensitive means including a movable member exposed to the inflation pressure of said tire and a resilient means for biasing said member toward the interior of said tire;

a ring-shaped coil mounted on said non-rotatable structure concentric with the axis of rotation of said wheel for impedance varying interaction with said resonant circuit, said coil including a plurality of loops electrically connected in series and arranged in a circular array, each of said loops being wound about an axis substantially perpendicular to said array to produce an annular force field, said coil extending along the path traveled by said resonant circuit as said wheel rotates so that said resonant circuit is at all times aligned with said force field;

interrogation means connected to said coil for measuring the combined impedance of said coil and said resonant circuit with respect to a cyclically varying signal and thereby determining the inflation pressure of said tire; and display means mounted on an instrument panel of said conveyance and responsive to said interrogation means for providing a visual indication relating to said tire pressure.

* * * * *